(12) United States Patent
Gao et al.

(10) Patent No.: US 8,290,975 B2
(45) Date of Patent: Oct. 16, 2012

(54) GRAPH-BASED KEYWORD EXPANSION

(75) Inventors: Chi Gao, Beijing (CN); Mingyu Wang, Beijing (CN); Weibin Zhu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 642 days.

(21) Appl. No.: 12/046,481

(22) Filed: Mar. 12, 2008

(65) Prior Publication Data

US 2009/0234832 A1 Sep. 17, 2009

(51) Int. Cl.
*G06F 7/00* (2006.01)
*G06F 17/30* (2006.01)

(52) U.S. Cl. ........ 707/767; 707/750; 707/705; 707/736; 707/748; 707/758; 707/759; 707/765; 707/766; 715/254; 715/256

(58) Field of Classification Search .................. None
See application file for complete search history.

(56) References Cited

U.S. PATENT DOCUMENTS

| | | | |
|---|---|---|---|
| 6,442,545 B1 | 8/2002 | Feldman et al. | |
| 7,617,205 B2 * | 11/2009 | Bailey et al. ........... | 707/999.002 |
| 2003/0110158 A1 | 6/2003 | Seals et al. | |
| 2005/0080775 A1 | 4/2005 | Colledge et al. | |
| 2005/0278325 A1 | 12/2005 | Mihalcea et al. | |
| 2006/0074870 A1 | 4/2006 | Brill et al. | |
| 2007/0106641 A1 | 5/2007 | Chi et al. | |
| 2007/0124291 A1 | 5/2007 | Hassan et al. | |
| 2007/0143176 A1 | 6/2007 | Nong et al. | |
| 2007/0143278 A1 | 6/2007 | Srivastava et al. | |
| 2007/0226202 A1 | 9/2007 | Cava | |
| 2007/0282826 A1 | 12/2007 | Hoeber et al. | |
| 2008/0189269 A1 * | 8/2008 | Olsen ............................... | 707/5 |
| 2008/0294677 A1 * | 11/2008 | Kurabayashi ................. | 707/102 |
| 2009/0077065 A1 * | 3/2009 | Song et al. ........................ | 707/5 |

OTHER PUBLICATIONS

"Random-Walk Computation of Similarities between Nodes of a Graph with Application to Collaborative Recommendation", IEEE Transactions on Knowledge and Data Engineering, Mar. 2007 (vol. 19 No. 3), pp. 355-369.*
"International Search Report", Filed Date Feb. 13, 2009, Application No. PCT/US2009/033980, pp. 1-13.

* cited by examiner

*Primary Examiner* — Jau-Shya Meng

(57) ABSTRACT

A keyword may be expanded into related words, such as for use in information retrieval. The terms comprising words and/or phrases of a large number of documents (e.g., web pages) are processed into a graph data structure, in which the terms are represented as nodes and edges represent the relationships between the nodes, with weights for each edge representing the relevance of the relationship. The graph may be built by selecting each term of a document and considering the terms within a certain number of words to be associated with the selected term; for each such association the weight indicative of the relevance is increased. When the graph is accessed with a keyword, the edges from that keyword's node and their respective weights indicate which other nodes are most relevant to the keyword, thereby providing the corresponding expanded terms.

15 Claims, 6 Drawing Sheets

GRAPH-BASED KEYWORD EXPANSION

BACKGROUND

Given a keyword, there are many situations (particularly in information retrieval technology) in which it is useful to expand the keyword into other related keywords, which is referred to as keyword expansion. For example, the keyword "Microsoft" may be expanded to "Windows", "Office", and so on. This facilitates returning more relevant search results, for example, such as when insufficient results are returned because of a limited search term or terms.

Previously, keyword expansion was accomplished by leveraging search engines. One such approach feeds a keyword to a Web search engine, receives results in response, and extracts related words from snippets generated from the returned results. These related words are used as the expanded keywords.

However, the above-described approach depends on the quality of the external search engine, and is further dependent on the availability and performance of the search engine. Further, the expansion depends on which algorithm is used to generate the snippets, none of which have heretofore worked particularly well.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a set of terms (comprising words and/or phrases) such as present in a plurality of documents (e.g., web pages) are processed into a graph from which an expanded set of terms may be determined given an input keyword (including an input phrase). In one aspect, each keyword is selected from among the terms in a document, and the other terms associated with that keyword are determined, such as based on proximity in the document to that keyword (e.g., within ten words). Each time a keyword is associated with a particular term, a weight indicative of that relationship is increased. After a number of terms from a number of documents have been processed in this manner, a data structure is built that corresponds to a graph, in which the keyword and terms are represented by nodes and an association between the keyword and each term is represented by an edge. The accumulated weight value, which is indicative of the relevance of the relationship between the keyword and each term, is associated with each edge.

In one aspect, keyword processing logic selects terms from a set of documents, and for each selected term, determines its related terms, and increases an association weight indicative of an association between that selected term and each related term. The result of the keyword processing logic is a data structure that corresponds to a graph, having nodes representative of the terms, and edges between the nodes representative of the association weights.

In one aspect, the data structure comprises a plurality of nodes, with each node representing a term. The data structure further includes a plurality of edges, with each edge representing a relationship between two of the nodes, and each edge having a corresponding weight value that indicates a relevance of the two nodes to one another. When the data structure is accessed with a keyword corresponding to a keyword node, the edges from the keyword node are used to determine which other nodes are most relevant to the keyword node based on the edges' weight values. The most relevant other nodes provide the expanded keywords. The other nodes may be limited to only those having a direct edge to the keyword node, or alternatively may include nodes having indirect relationships to the keyword, that is, through other nodes.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a standalone, high-performance keyword expansion mechanism that generates expanded keywords and maintains them in a data structure such as a graph. In one example, keyword-to-keyword relationships are extracted from a set of web pages, with the keywords and their relationships stored as an undirected graph. For example, the keywords are maintained as nodes, with each edge in the graph describing a weight of the relationship between those two associated keywords. When a keyword needs to be expanded, expansion takes place by accessing the graph to find the input keyword's connected keywords, which may then be sorted by their weights as indicated by their edges. Alternative data structures may be used, such as a directed graph in which at least some of the edges are directed between nodes.

While the examples herein are directed towards processing text-based documents (e.g., web pages) to develop a keyword expansion graph, it is understood that these are only examples. For example, data other than text may benefit from similar technology, such as when analyzing relationships of numerical patterns. Further, while a graph is described herein for maintaining the keyword relationships, it is understood that other data structures may be alternatively maintained.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, information retrieval and/or document processing in general.

Figure 1:
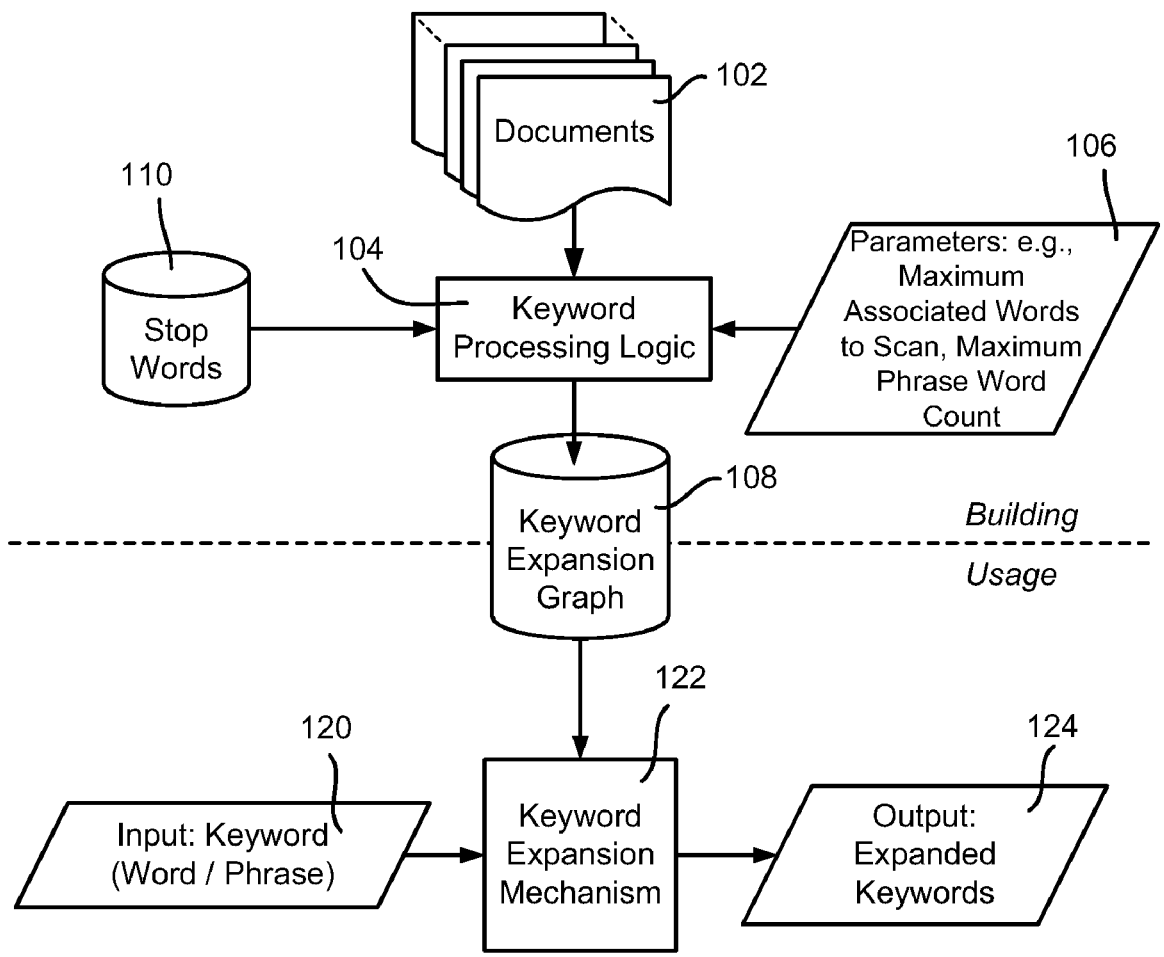
FIG. 1 is a block diagram representing example components for generating a keyword based expansion graph from a set of documents.

Turning to FIG. 1, there are shown example components for processing a set of documents 102 into a data structure from which a given keyword may be expanded into related terms comprising other words and/or phrases. Note that in general, keyword processing logic 104 scans through the documents in an offline building process, and based on parameters 106 which may be default values or optionally provided, generates a keyword expansion graph 108. When scanning, or optionally in a document pre-filtering operation, certain frequently appearing words that are known to the keyword processing logic 104 as typically being not meaningful keywords, such as "and" "the" and "a" (sometimes referred to as stop words 110), may be excluded from the graph 108.

Figure 2:
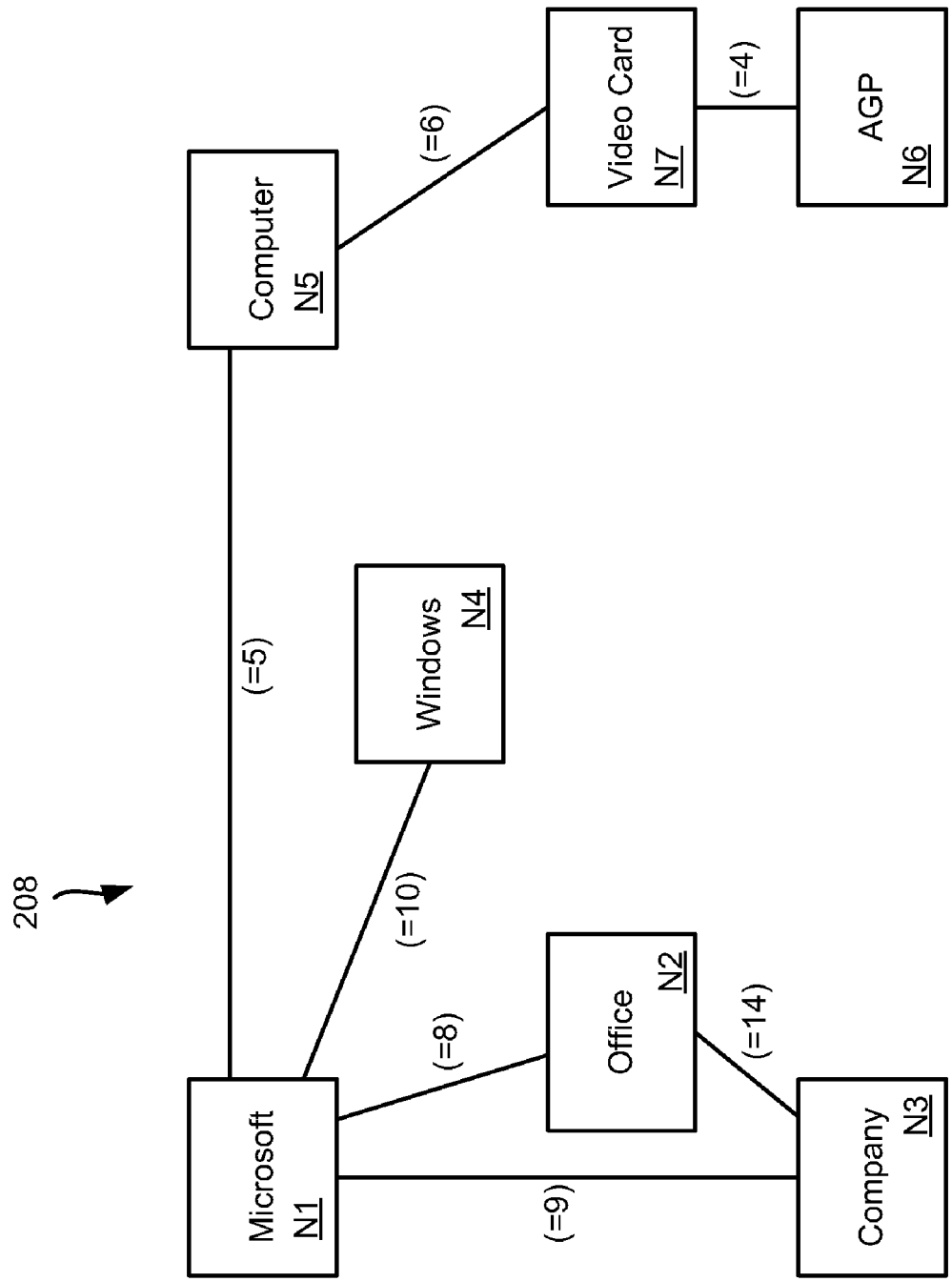
FIG. 2 is a representation of a simplified example graph generated from a set of documents.

FIG. 2 shows a simplified example expansion graph 208, in which each word and/or phrase is represented by one of the nodes N1-N7. Each word (nodes N1-N6) and/or phrase (node N7) is associated with at least one other word and/or phrase, with associations between word and/or phrases represented by edges between the nodes N1-N7; (note that in an actual graph there are also separate nodes for "video" and "card" but these are not shown in this simplified example). For purposes of brevity, "term" will be used to refer to a word and/or a phrase except where otherwise noted; also terms/words need not correspond to actual words, but may be any letter or combination of letters, e.g., names including proper names, as well as the acronym "AGP" each may be considered a word/term. Further, a "keyword" is a term, and may actually be a phrase rather than a single word or other character grouping.

As described below, the keyword processing logic creates the associations based on proximity in the documents, and also weighs the associations (e.g., as counts) based on their frequency of occurrence. Thus, in the example of FIG. 2, it is seen that "Microsoft" has an association with "Company" having a weight equal to nine (9), with "Office" having a weight equal to eight (8), with "Windows" having a weight equal to ten (10), and with "Computer" having a weight equal to five (5). These associations are first-level relationships in that there is a single direct edge between the "Microsoft" node N1 and these other words represented by nodes N2-N5. In contrast, the node N1 has a second-level relationship with the phrase "video card" (node N7), and a third-level relationship with the word (actually acronym) "AGP" (node N6).

It should be noted that the number of documents 102 that are processed is typically on the order of millions. As such, relative to those exemplified in FIG. 2, an actual typical keyword expansion graph contains an extremely large number of nodes (terms) and edges (associations), with similarly much larger association weights. Depending on resources, it may be necessary to partition the graph into sub-parts; further, distributed computing and/or storage may be employed to deal with the large amount of data.

Returning to FIG. 1, once the graph 108 has been built, given an input keyword or phrase 120, a keyword expansion mechanism 122 accesses the graph 108 to locate associated terms. These may be ranked according to their score such as to find a "best" subset comprising a desired number (e.g., on the order of one-hundred or two-hundred) of associated terms (e.g., words and/or phrases), which may then be output in some way as a set of expanded keywords 124.

Figure 3A:
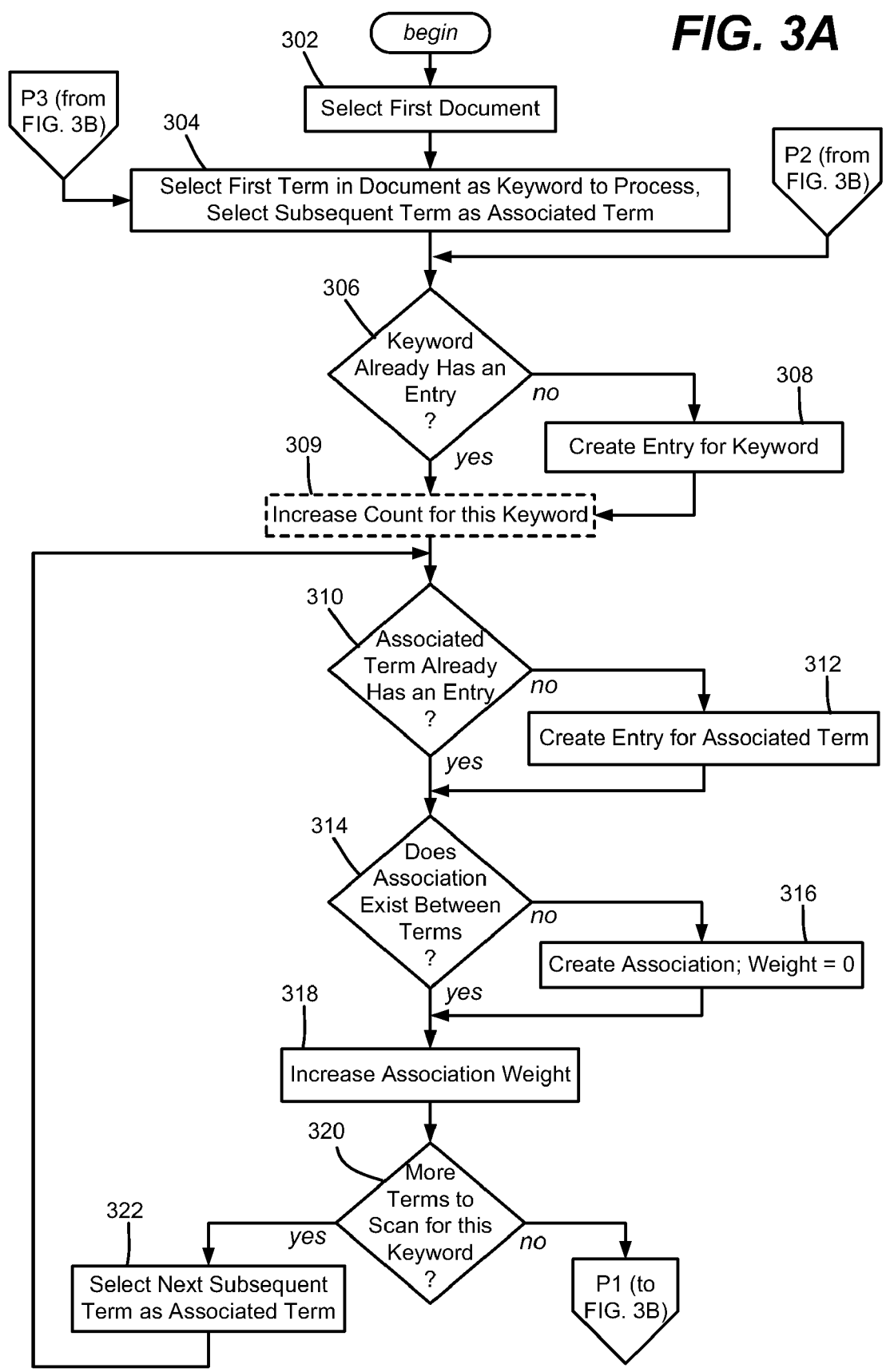
FIGS. 3A and 3B comprise a flow diagram showing example steps taken to generate a keyword based expansion graph from a set of documents.
Figure 3B:
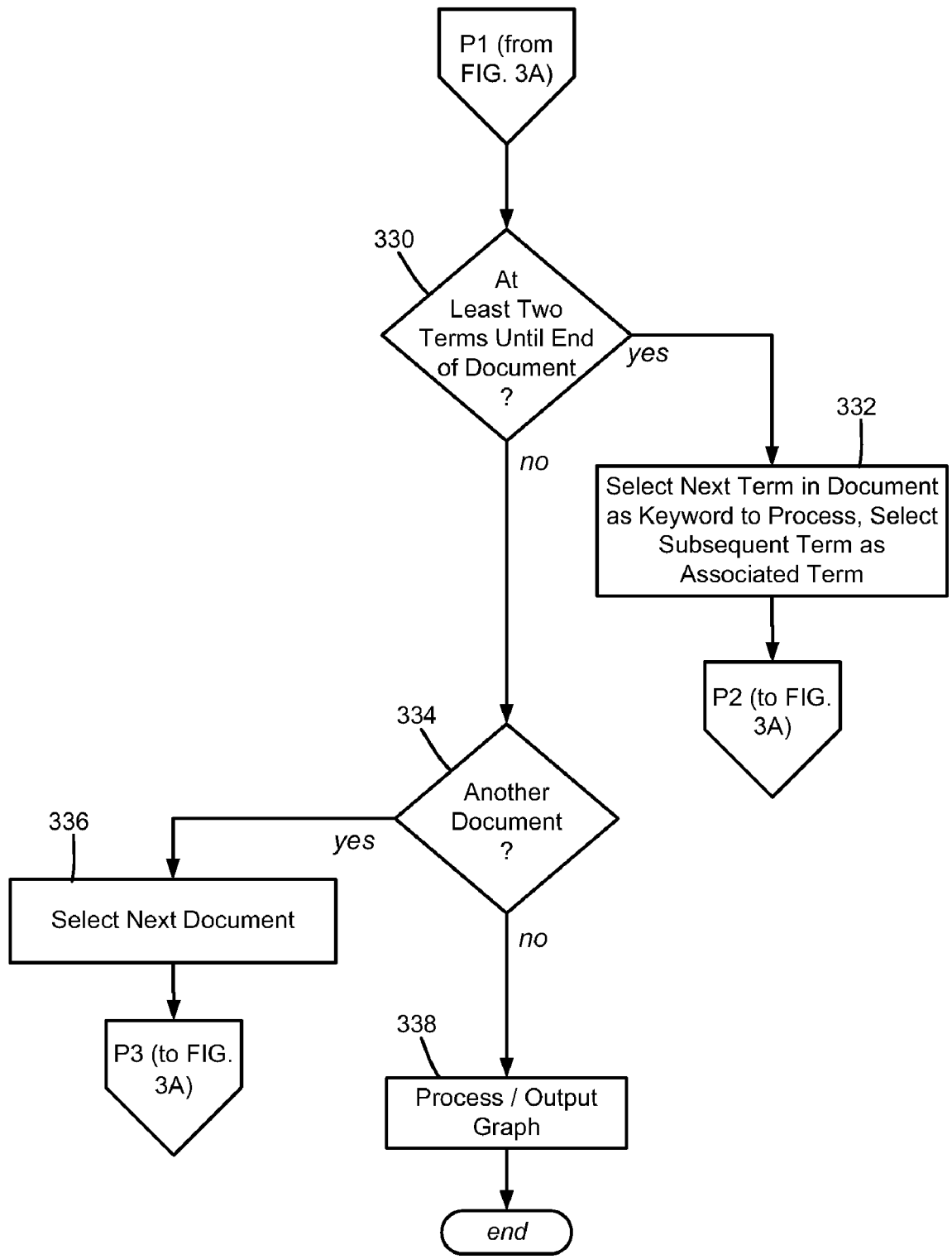

Turning to FIGS. 3A and 3B, there is shown an example process for building a keyword expansion graph from a set of documents, typically correspond to web pages. In general, each document is scanned word by word, and for each word X, the n (e.g., ten, which may be a default value or input as a parameter 106) words thereafter are considered to have an association comprising a relationship (of weight one) with the word X. By way of example, given a set of terms "A B C D E F G" it is seen that with A as a keyword, the associated terms B, C, D, E, F and G each have a weight (count) of one; (as described below, actual proximity or other criteria may be used to assign a different weight to each term).

Note that the weight is increased (e.g., incremented) each time the same such pair of words is found. Further note that (X, Y) and (Y, X) are considered to be the same with respect to their association. When the documents have been processed in this manner, the graph is built.

In the more particular example of FIG. 3, step 302 represents selecting the first document of a (typically very large) set, and step 304 represents selecting the first two words in the document, the first as the keyword and the second, subsequent word as an associated word. When selecting words during scanning, certain words such as "the" and "a" (sometimes referred to as stop words) need not be included, but may be included depending on the desired results; in one alternative such words may be filtered from the document before scanning. Thus, the selection of a keyword and term at step 304 may inherently include excluding any stop word or words. Note that while such words may not be selected as keywords with respect to the graph, they may be used when counting the n (e.g., ten) words proximate the currently selected keyword being processed.

Step 306 determines whether the keyword already has an entry (node) in the graph; if not, step 308 is executed to create a node for the term. Optional step 309 may be performed for purposes of tracking the frequency of occurrence of each keyword, such as for removing rarely occurring terms as described below. Step 310 determines whether the associated term already has an entry (node) in the graph; if not, step 312 is executed to create a node for the associated term.

Step 314 evaluates whether the keyword and associated term already have a defined association, corresponding to an edge. If not, such as association is created at step 316. At step 318, the association weight is increased, e.g., its count is incremented by one.

Steps 320 and 322 repeats the process until the number n of subsequent terms reaches a limit, e.g., the ten subsequent terms have been processed with respect to the currently selected keyword. Alternatively, the processing of this keyword ends at step 320 when there are no more associated terms in the document to select for processing with the keyword, e.g., the last associated term was the last term in the document.

Steps 330 and 332 of FIG. 3B represent advancing to the next keyword in the document, which continues as long as there is at least one keyword and an associated term to associate with that keyword. Step 322 returns to step 306 of FIG. 3A to process this next keyword and its subsequent associated term, as described above.

When step 330 determines that the end of the document has been reached, step 330 branches to step 334. As can be understood, steps 334 and 336 repeat the process for other documents by returning to step 304 of FIG. 3A. When no documents remain, the graph is complete and may be output in some way, such as persisted to a database file, as represented via step 338. Note that as also represented by step 338, some processing may be performed on the graphs, e.g., to compress it or prune it in some way, such as by removing nodes and/or edges that are statistically unlikely to ever be needed.

The above-described graph-building process was only one example, and it may be readily appreciated that the process may be tuned and/or otherwise varied to provide additional accuracy. For example, rather than weighting each keyword and associated term with a weight of one, a weight may be relative to its position with respect to the keyword, e.g., the closer the keyword is to a term, (e.g., one word away, two words away, and so forth) the higher the weight added to the association weight. As another example, a larger weight may be given to two terms that appear together in a particular (e.g., title) section of a document, as opposed to another section (e.g., in the main body). Alternatively, or in addition, the weight on an edge may be divided by the frequency of the two words.

Figure 4:
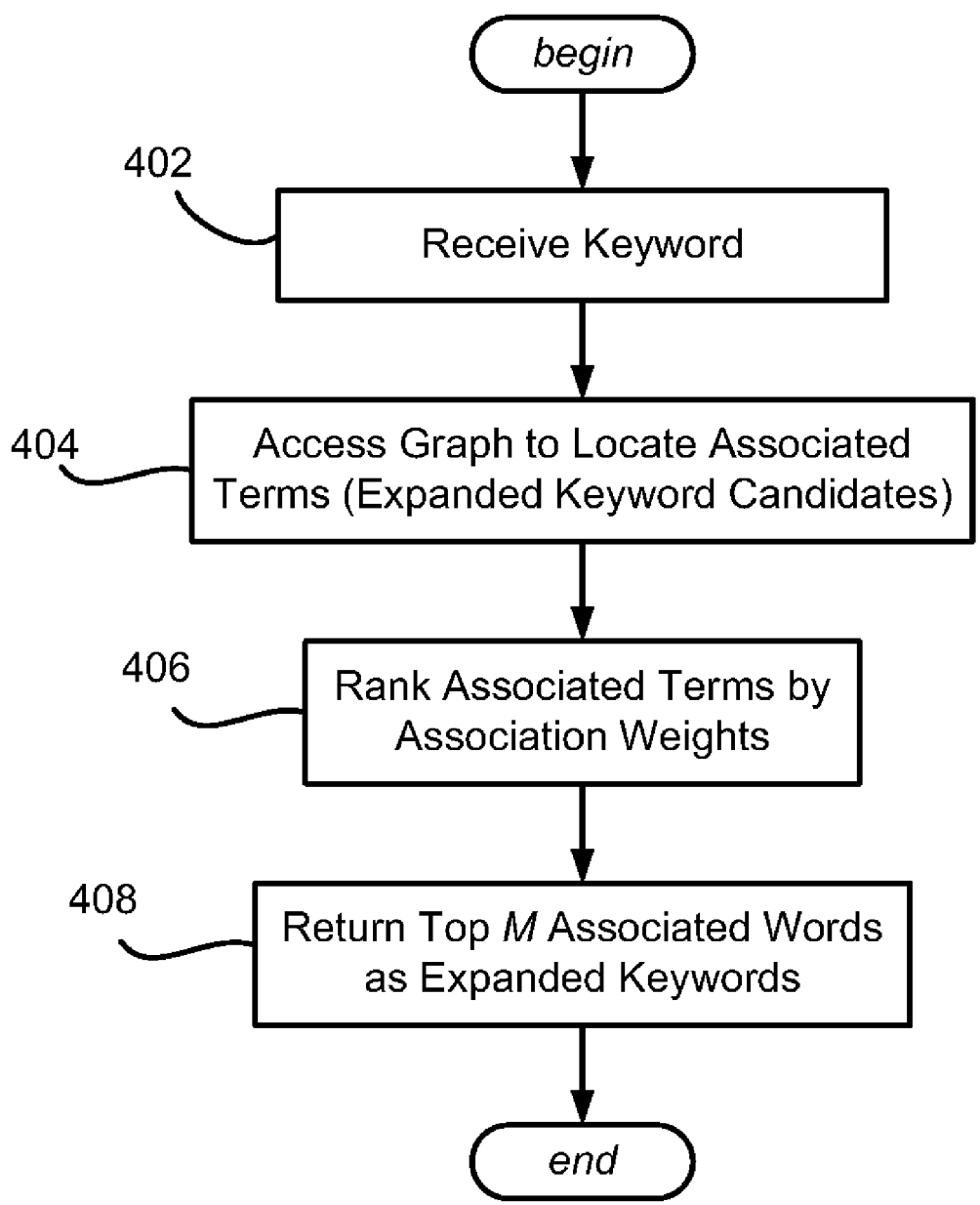
FIG. 4 is a flow diagram showing example steps taken to uses a keyword-based expansion graph.

FIG. 4 represents example operations for handling a keyword received from some requesting entity once the graph has been built. For example, a search engine may comprise the entity that provides the keyword, such as for generating additional search terms to respond to a query. As represented by step 402, when a keyword is received, the process accesses the graph (step 404) to find the edges that are connected to that keyword. The nodes at the other ends of the edges represent the associated terms, which are the candidates for the expanded keywords; the weights corresponding to the edges provide their relative weights.

Step 406 ranks the associated terms according to their weights. Step 408 returns the top M terms as the expanded keywords.

In another aspect, when locating (at step 404) a keyword's associated terms in the graph, the process may go beyond a single direct edge and consider one or more indirect edges, whereby the expansion result may contain indirectly related words. For each additional step, the actual weight may be reduced (e.g., as part of step 406) in some way, such as by percentage, square root or the like to reflect the level of indirection. Note that such indirect terms may be always considered when locating terms, or instead may be done only selectively, such as when the number of direct terms is less than some desired number, or if there is a large disparity in weights among the direct terms such that it is likely that an indirect term may have more weight than a direct term.

By way of an example using the simplified graph 208 of FIG. 2, consider that "Microsoft" was given as a keyword. If only direct related terms are returned, (that is, a first-level/one-step relationship), the expanded keywords and their weights correspond to the following table:

| Expanded word | Weight | Note |
| --- | --- | --- |
| Windows | 10 | |
| Company | 9 | |
| Office | 8 | |
| Computer | 5 | |

If instead the keyword expansion mechanism allows up to a second-level/two-step indirect relationship, the expanded keywords and their weights correspond to the following table (with an example fifty-percent weight reduction for the second-level indirection; as described below such a percentage reduction may not be suitable but is shown herein for purposes of an example explanation of reduction):

| Expanded word | Weight | Note |
| --- | --- | --- |
| Windows | 10 | |
| Company | 9 | "Office"-to-"Company" second-level edge is ignored because "Company" is already selected in a one-step relationship with input term. |
| Office | 8 | |
| Computer | 5 | |
| Video Card | 3 | Weight is multiplied by 50% because of the two-step relationship. |

If in another alternative the keyword expansion mechanism allows up to a third-level/three-step indirect relationship, the expanded keywords and their weights correspond to the following table, in which another fifty percent reduction, is used for the third level (now twenty-five percent):

| Expanded word | Weight | Note |
| --- | --- | --- |
| Windows | 10 | |
| Company | 9 | "Office"-to-"Company" edge is ignored because "Company" is already selected in a one step relationship with input term. |
| Office | 8 | |
| Computer | 5 | |
| Video Card | 3 | Weight is multiplied-by 50% because of the two step relationship. |
| AGP | 1 | Weight is multiplied by 25% because of the three-step relationship. |

It should be noted that the exemplified percentage reduction is only an example, and does not work well unless the weights are first normalized in some way. For example, the terms "computer" and "video card" may have a large weight between them; a weight of "300" between nodes N5 and N7 results in a weight of "150" if simply multiplying by one-half, which is larger than any direct relationship in this example and is likely not intended to outweigh the first-level direct relationship (with a weight of five) from which it was reached. To avoid such situations, normalization and/or more sophisticated computations may be used, e.g., an indirect relationship's weight may be no larger than its more direct relationship's weight, and so on, although some consideration may be given to how large the indirect weight is.

Another aspect/alternative relates to accumulating or otherwise factoring in weights of multiple paths to the same node. For example, unlike the latter two tables which ignored the "Office" to "Company" edge because "Microsoft" already had a direct edge to the "Company" node, the Microsoft" to "Company" relationship weight may be enhanced by the indirect relationship thereto via the "Office" node. While this particular example of FIG. 2 shows multiple paths comprising a first and second-level indirect relationship, it is understood that third-level and even greater indirect relationships may be considered in determining a final relative weight. Moreover, as above, some reduction in weight for the indirect path and/or paths is likely appropriate, and it should be noted that the weight reduction (or reductions) for multiple paths (e.g., node N1 to N3, and node N1 to N2 to N3) need not be the same formula or the like as is used for the weight reduction or reductions for an indirect path e.g., node N1 to N5 to N7 to N6.

Yet another aspect is that network flow algorithms may be applied to a graph for both directed graphs and undirected graphs. For example, for a directed graph, the requested keyword is considered as a source node, with a virtual target node (logically inserted) that is connected directly to the other nodes that are in range (up to the appropriate level). Note that there is no level restriction that is required, however; e.g., all other nodes in the graph may be connected with the target virtual node, with flow taking place to the extent possible.

While many of the examples herein referred to one-word terms, support for phrases as keywords/expanded keywords is also provided. Note that a "maximum phrase word count" is defined such that any combination of words found in a document that is less than or equal to the count are considered as a term to be processed and may be maintained as a node in the graph (subject to removal for size purposes).

By way of example, given a word sequence of "A B C D E F G" with a maximum phrase word count of three, not only will individual words for A, B, C, D, E, F and G become nodes, but also pairs and triplets will become nodes. For example, AB will be associated with C, AB will be associated with D, AB will be associated with E, AB will be associated with F, BC will be associated with A, BC will be associated with D, and so forth. Note that stop words may be considered part of a phrase or not, depending on desired results, e.g., the text "A and B" may not be considered a phrase "A B" because of the stop word "and" between them, or alternatively may be, but possibly with a lesser weight with respect to associated terms "C" and so on.

As can be readily appreciated, when supporting phrases, the resulting amount of data may become impractically large to store and use for keyword expansion. However, many words and/or phrases will only occur relatively rarely among the documents. Thus, as part of building the graph, a count or the like corresponding to the frequency of a word or phrase frequency may be accumulated and recorded (e.g., at step 309 of FIG. 3A) whereby words/phrases having a low occurrence frequency may be cut (e.g., at step 338 of FIG. 3B). Cutting may be accomplished by using two-pass statistics, e.g., a first pass may consider word/phrase frequency, and the second pass may consider relationships, e.g., relationships with relatively low weights may be eliminated.

Exemplary Operating Environment

Figure 5:
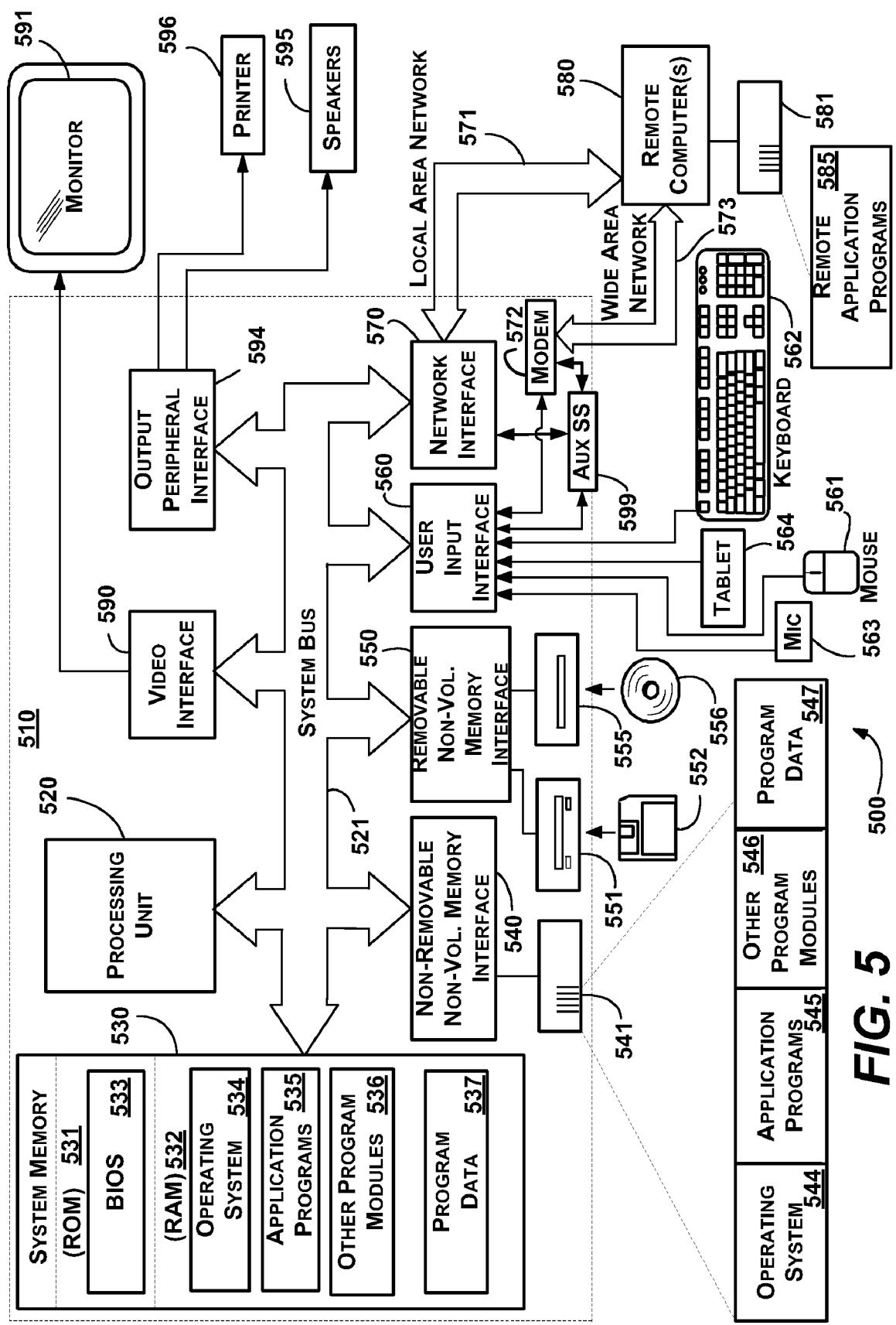
FIG. 5 shows an illustrative example of a computing environment into which various aspects of the present invention may be incorporated.

FIG. 5 illustrates an example of a suitable computing and networking environment 500 on which the examples of FIGS. 1-4 may be implemented. For example, the keyword processing logic 104 and/or keyword expansion mechanism 122 may be implemented in the computer system 510. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. One or more computers comprising one or more processors and storage, the one or more computers comprising:
    keyword processing logic stored in the storage and executed by the one or more processors, the keyword processing logic building a graph data structure prior to query expansion performed by a reading a plurality of documents, the graph data structure comprising a cyclic graph, selecting all terms from portions of the documents after filtering out stop words, the terms comprising individual words or word phrases as found in text of the documents, and counting how many times each selected term is within a threshold distance of every other selected term in the plurality of documents, and for each of the pairs of terms in the selected terms that are within the threshold term distance of each other in any of the documents, setting association weights indicating numbers of times the terms of the respective pairs were determined to be within the threshold term distance of each other, and wherein terms in a document that have a distance therebetween beyond the threshold term distance are not counted,
    the keyword processing logic accessing a graph data structure built from output of the keyword processing logic, the graph data structure comprised of nodes and edges, with the nodes representative of only the selected terms that were determined to be within the threshold term distance of each other, each node of the graph data structure representing only a single corresponding term that is not represented by any other node of the graph data structure, and the edge between any two nodes having one of the association weights that corresponds to the terms of the two nodes, and storing the graph data structure in the storage of the one or more computers, wherein any two arbitrary terms in the graph data structure have only one edge therebetween, and the graph is cyclic, and the keyword processing logic receiving a query comprising a query term, looking up the query term in the graph data structure to find a node matching the query term, ranking a set of terms connected with the found node according to corresponding association weights, selecting a top-ranked subset of the ranked terms, and expanding the query with the subset of top-ranked terms before the query is passed to a search engine.

2. The one or more computers of claim 1 wherein each phrase contains fewer words than a value that is based on a word count parameter provided to the keyword processing logic.

3. The one or more computers of claim 1 wherein the threshold term distance comprises a predefined number of words.

4. The one or more computers of claim 3 wherein the certain number of words is provided as a parameter to the keyword processing logic.

5. The one or more computers of claim 1 wherein the keyword processing logic is configured to detect the stop words, which are excluded with respect to being selected for nodes in the graph.

6. The one or more computers of claim 1 wherein the keyword processing logic reduces nodes in the data structure based on term-related frequency data, or based on low association weights, or based on both term-related frequency data and low association weights.

7. The one or more computers of claim 1 wherein the when ranking the set of terms a weight for a term that has only an indirect association with the found node is reduced.

8. Memory and/or magnetic storage device having stored thereon:

a data structure comprising a cyclic graph, comprising:
    a plurality of nodes, each node representing only a single term extracted from a corresponding subset of documents in a plurality of documents, the nodes representing only the terms extracted from the plurality of documents, the terms having been identified by processing a plurality of documents and counting pairs of terms within a threshold word distance of each other in one or more of the documents, wherein pairs whose terms are not within the threshold word distance of each other are not counted;
    a plurality of edges, each edge representing a direct relationship between only two of the nodes, and each edge having a corresponding weight value that was computed by counting how many times the two terms connected by the edge were within a threshold distance of each other in the plurality of documents, wherein each node directly connected to another node is directly connected by only one edge; and
instructions comprising:
    receiving a user-inputted query comprising a plurality of query terms, and expanding the query by adding one or more related terms to the query, the related terms being found by accessing the data structure to find one of the query terms therein, ranking terms in a set of terms that are connected with the found query term according to the weight values of edges connecting the found query term to the terms in the set of terms, respectively, and selecting a top-ranked subset of one or more of the ranked terms as the one or more related terms that are added to the query, wherein the query with the related terms is passed to a search engine.

9. The memory and/or magnetic storage device of claim 8 wherein only edges from the found query term directly connecting to other nodes are used to identify the set of terms.

10. The memory and/or magnetic storage device of claim 8 wherein at least one of the terms in the set of terms does not have a direct edge to the found query term.

11. A method performed by one or more computers, the method comprising:

receiving a set of documents each comprised of text to be processed;

building, for the set of documents, a cyclic graph comprising a set of terms and comprising a set of edges connecting respective pairs of the terms, where each edge directly connects only two terms, and for any two given terms the terms are directly connected only by one edge, the building performed by, for each document, for a given document:

parsing the text of the given document with one or more processors of the one or more computers to identify a sequence of terms in the text of the given document, forming pairs of the terms by pairing each term in the sequence with every other term in the sequence of terms that is within a predefined term distance, the predefined term distance comprising a number of terms, and for each such formed pair, determining whether the pair is already represented by an edge in the graph connecting the terms of the pair, and in accordance with the determining: adding to the set of edges a new edge connecting the terms of the pair when the set of edges has no edge connecting the terms of the pair, and when there is an edge connecting the terms of the pair increasing the weight of the edge connecting the terms of the pair;

storing the graph in memory of the one or more computers, wherein the set of terms includes terms from each document in the set of documents, at least some of the weights having been increased according to corresponding pairs of terms having been determined to be within the term distance of each other in multiple of the documents, wherein the weight of any given edge indicates a number of times corresponding terms connected by the given edge were determined to be within the predefined term distance of each other in the entire set of documents; and using the graph to expand a query term of a query by finding terms linked to the query term in the graph, ranking the found terms according to the weights of respective edges to the query term, and providing one or more of the ranked terms to be added to the query.

12. A method according to claim 11, wherein the term distance comprises a number of words.

13. A method according to claim 11, wherein the weight of an edge is increased in proportion to a distance between two corresponding terms in a document.

14. A method according to claim 11 further comprising removing edges according to a minimal weight value whereby edges with weights below the minimal weight value are removed.

15. A method according to claim 11 wherein the terms comprise single words and word phrases, and where the building further comprises omitting or ignoring stop words in the given document.

* * * * *